Oct. 19, 1926.
F. K. BENEDICT
1,603,893
SHAPER FOR THE TEETH OF SAWS
Filed Oct. 23, 1924
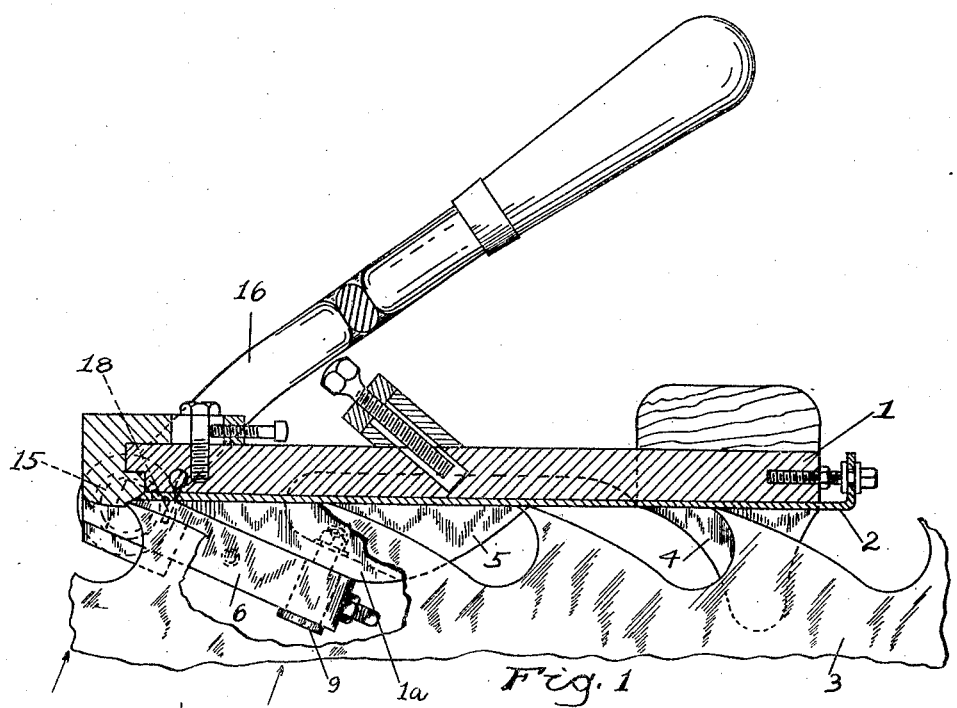
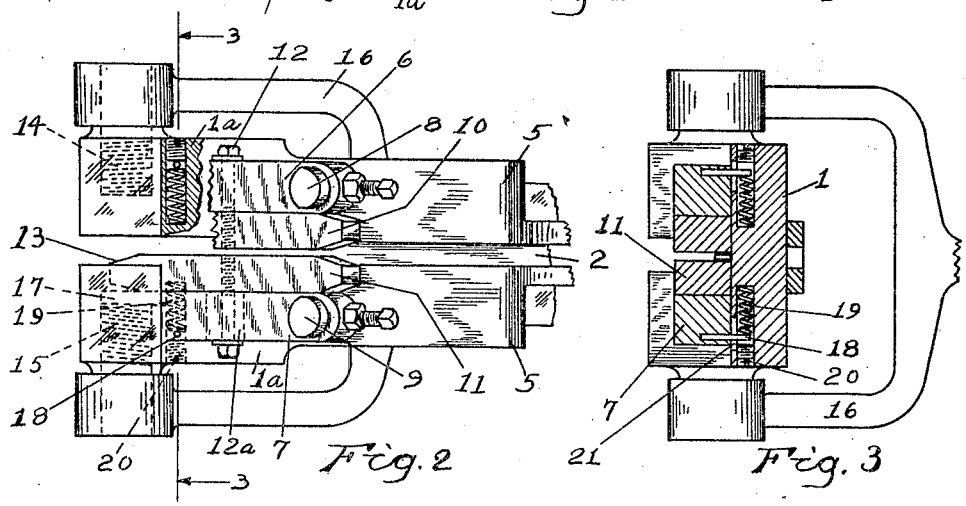
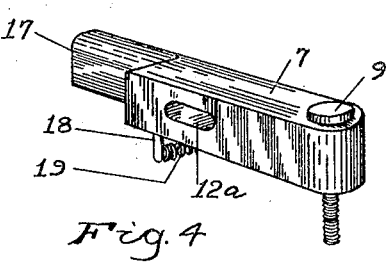

Patented Oct. 19, 1926.

1,603,893

UNITED STATES PATENT OFFICE.

FREDERICK K. BENEDICT, OF BIG RAPIDS, MICHIGAN, ASSIGNOR TO MACHINERY COMPANY OF AMERICA, OF BIG RAPIDS, MICHIGAN.

SHAPER FOR THE TEETH OF SAWS.

Application filed October 23, 1924. Serial No. 745,404.

This invention is a shaper for the points of saw teeth. It pertains more particularly to side dressers for bringing the swaged teeth of band-saws to uniform width and shape.

More specifically my present improvement comprises a device whereby each member of the pair of side dressing dies is made to automatically release the saw teeth when the pressure of the die-operating screws is removed. The dies separate so there is always room for the saw between them, and they are held away from the saw blade except when the pressure of the die-actuating screws is applied.

An object of my present improvement is to so arrange the parts that spring pressure is applied independently to each of the die carriers and the actuating springs are entirely concealed within the body of the shaper. The springs, not being exposed, are protected in use against becoming clogged by dirt, yet are readily accessible when desired.

With the foregoing and certain other objects in view which will appear later in the specifications, my invention comprises the devices described and claimed and the equivalents thereof.

In the drawings, Fig. 1 is a longitudinal section of a shaper embodying my improvement, the shaper shown as applied to the teeth of a saw, the saw being partly broken away.

Fig. 2 is a part sectional view of the shaper as shown in Fig. 1, when viewed from below in the direction of the arrows. One die and its carrier are shown broken away.

Fig. 3 is a part section taken on the line 3—3 of Fig. 2.

Fig. 4 is a perspective view of one of the die-carriers and of the spring by which it it automatically retracted.

As is clearly shown in the drawings, the shaper, as is usual, consists in a body 1 adapted to rest lengthwise on the points of the saw teeth, as shown in Fig. 1. A bearing bar 2 is preferably applied to the under side of the body to protect it from wear by contact with the saw teeth. 3 designates the saw. The body has a pair of depending flanges 4 at the rear to straddle the saw and a similar pair of guiding flanges 5 are located near the front or working end of the body.

Since the teeth extend rearwardly and downwardly with respect to the length of body 1, the side dressing of the teeth is done by a pair of die carriers or jaws that extend rearwardly and downwardly from the front end of the body. They are pivoted at their lower ends by pins 8 and 9 to a rearwardly and downwardly inclined faceplate, integral with the body 1, as shown in Fig. 1.

To the face of each jaw 6, 7 is fastened, by bolts 12 through slots 12$^a$, a hard metal block or die 10 or 11, as shown in Figs. 2 and 4. The ends of each die are preferably beveled as at 13 to properly shape the saw teeth. The dies, as is usual, are forced together in the swaging operation by means of screws 14, 15, operated by the lever 16.

Preferably the free end of jaw 7 is of reduced thickness, as at 17, and it is against this part that the clamping screw has its bearing.

In my present improvement I provide, as above stated, means for independently drawing back each of the dies 10 and 11 as soon as the pressure of the screws 14 and 15 is released, and to this end I apply to the dies, preferably through the medium of the movable jaws 6 and 7, the pressure of a yielding spring. This spring is concealed and is protected against dirt while the machine is in use.

In the preferred form of my improvement, as shown in Fig. 3, I attach to each jaw or carrier 7, a projecting pin 18. This pin takes against the end of a spring 19, and the spring tends to force the carrier 7 away from the saw teeth.

In the preferred form illustrated, the spring 19 is concealed in a recess formed in the body 1, close to the jaw 7. The pin 18 projects through a slot 21 and takes against the end of spring 19. When the dies 10 and 11 are forced inward by the screws 14 and 15 the springs 19 are compressed, and when the screw pressure is released the springs force the carriers and their dies apart.

Obviously the relative locations of the pin 18 and the spring 19 may be reversed without departing from my invention as described and set forth in the claim. For example, the springs 19 may be concealed within the carrier 7 instead of within the body 1, and the pin 18 may be fixed to the body 1 instead of to carrier 7.

To completely conceal the spring 19 and the pin 18 I prefer to employ a plug 20 to close the recess.

By the means above described I have produced a simple and inexpensive device adapted to be applied to a saw tooth shaper, whereby the dies are always kept out of engagement with the saw except when they are purposely operated by the handle 16, and the retracting device is concealed and protected.

Having thus described my invention, what I claim and desire to secure by Letters Patent is:

1. In combination, a shaper for the points of saw teeth including a body and a pair of die-carriers pivoted to the face thereof and slidable thereon, a spring for retracting each die-carrier independently, said spring concealed within a recess in said body, said recess located in proximity to and parallel with said face, said body formed with a slot connecting said recess and face, a downwardly projecting member on said die-carrier extended through said slot into said recess and engaging an end of said spring.

2. In combination, a shaper for the points of saw teeth including a body member and a pair of die-carrier members pivoted thereto, a spring for retracting each die-carrier independently, said spring concealed within a recess in one of said members, a pin on said other member, said pin extending into said recess and having its end in engagement with an end of said spring, for the purposes set forth.

In testimony whereof, I affix my signature.

FREDERICK K. BENEDICT.